Aug. 26, 1969

L. T. KAYSER 3,462,956

ROCKET DRIVE COOLING ARRANGEMENT

Filed Nov. 28, 1967

INVENTOR
Lutz T. Kayser
BY
Michael S. Striker,
ATTORNEY

United States Patent Office 3,462,956
Patented Aug. 26, 1969

3,462,956
ROCKET DRIVE COOLING ARRANGEMENT
Lutz T. Kayser, 10 am Bismarckturm,
7 Stuttgart, Germany
Filed Nov. 28, 1967, Ser. No. 686,152
Claims priority, application Germany, Nov. 29, 1966,
K 60,812; Oct. 12, 1967, K 63,584
Int. Cl. F02k 9/02, 11/02
U.S. Cl. 60—258                  16 Claims

ABSTRACT OF THE DISCLOSURE

A rocket drive cooling arrangement in which at least one propellent component, i.e., fuel or an oxidizing agent is injected against the concave toroidal outer surface of a portion of the nozzle projecting into the burner chamber of the rocket drive so that the component flows first along this outer surface and passes then in countercurrent to the hot combustion gases leaving the burner chamber through the nozzle along the inner surface of the burner chamber to thereby cool the nozzle and the wall of the burner chamber.

BACKGROUND OF THE INVENTION

The present invention relates to an arrangement for cooling a rocket drive using liquid or gaseous propellents in which also a mixture of the aforementioned propellents may be advantageously used. The term propellent component as hereafter used in the specification, may designate either a fuel or oxidizing agent and the propellent may be composed of more than two of such components.

Various arrangements for cooling; rocket drives are known in the art and the known rocket drive cooling arrangements can be divided in the following four principal types, each of which has, however, certain disadvantages:

(1) The so-called regenerative cooling arrangement which the propellent components are guided through cooling jackets which enclose the nozzle and the burner chamber of the rocket drive so that the propellents in passing through the cooling jacket will absorb part of the heat developed in the nozzle and the burner chamber. This cooling arrangement has the disadvantage of requiring, especially in large rocket drives, excessive space and in addition of not being explosion-proof, especially with highly volatile propellent components.

(2) The so-called ablation cooling in which the burner or combustion chamber as well as the nozzle is formed from a material having a low heat conductivity, for instance carbon or plastic material which forms a tough fused mass and which is preferably reinforced by fibers. During operation of the nozzle drive, the surface of the material will thereby assume the temperature of the combustion gases in the combustion chamber, whereby the heat is reflected into the combustion chamber. A combustion chamber constructed according to the aforementioned principle has, however, the disadvantage that due to irregular wear the danger of an asymmetrical erosion of the nozzle will result.

(3) In the so-called film or transpiration cooling a cooling action of the endangered wall portions is obtained by injecting the propellent components spirally into the combustion chamber or by feeding the propellent components through pores or fine holes through the walls of the combustion chamber and the nozzle. In this arrangement a reduction of the output will however result due to the ejection of unburned propellent components along the boundary layers of the flow of the propellents.

(4) In the so-called radiation cooling the combustion chamber and the nozzle have to be formed from high melting material since they reach approximately the combustion temperature of the combustion gases and radiate the heat to the surrounding components, whereby a disadvantageous heating of the surrounding components will take place.

It is an object of the present invention to provide for a rocket drive cooling arrangement which avoids the above-mentioned disadvantages of such arrangements known in the art.

It is a further object of the present invention to provide for a rocket drive cooling arrangement which will result in an especially intensive cooling in the region of the smallest cross-section of the nozzle of the rocket drive in which a high proportion of the heat developed during operation of the rocket drive will be concentrated.

It is a further object of the present invention to provide for a rocket drive cooling arrangement which is relatively simple in construction so that the arrangement may be manufactured at reasonable cost and will stand up perfectly under extended use.

SUMMARY OF THE INVENTION

With these objects in view, the rocket drive cooling arrangement according to the present invention mainly comprises wall means defining a burner chamber having an inner surface, nozzle means connected to the wall means and having an inner portion extending into the burner chamber and having an inlet end and an outer portion integral with the inner portion and having an outlet end, in which the inner portion of the nozzle means has an outer concave toroidal surface having at the inlet end a free annular edge spaced from and facing the inner surface of the burner chamber, and a pair of passage means for respectively injecting propellent components into the burner chamber, in which at least one of the passage means is arranged for injecting the component passing therethrough in radially inward direction onto the outer surface of the inner nozzle portion so that due to the high injection speed and the centrifugal force resulting therefrom, the liquid or gas stream will be pressed at high speed against the outer surface of the inner nozzle portion where the smallest cross-section of the nozzle is located so that an intensive cooling of the nozzle portion in which the greatest heat concentration will occur will be produced.

The fluid stream will pass along the outer surface of the inner nozzle portion in countercurrent to the hot combustion gases passing through the nozzle passage which further improves the cooling action.

Subsequent thereto the propellent material will flow in substantially radially outward direction from the free edge of the inner end of the nozzle onto the concave inner surface of the burner chamber to be pressed by centrifugal force against the latter to flow along the inner surface in countercurrent to the hot combustion gases forming in the burner chamber. The combustion starts at the inner surface of the burner chamber and the combustion gases will flow to the center of the chamber and through the nozzle to the outside of the latter while the non-combusted propellents fed into the burner chamber will flow along the inner surface thereof. The inner surface of the combustion chamber provided with a cooling arrangement according to the present invention is preferably spherical, cylindrical or of toroidal shape.

In one construction according to the present invention, both propellent components, that is the fuel and the oxidizing agent may be fed in radially inward direction onto the aforementioned concave toroidal outer surface of the inner nozzle portion to flow together along the surface. Experiments have, however, shown that it is advantageous in high output rocket drives not to inject the two propellent components, that is the fuel and the oxidizing agent, together onto the inner portion of the nozzle since at relatively large dimensions of the inner nozzle portion, a premature reaction of the mixed propellent components will take place in the region of the inner nozzle portion so that a reduced cooling action will result.

According to the present invention the two propellent components may therefore, especially in large rocket drive arrangements or in rocket drive arrangements which use propellents with a high reaction speed, be injected separated from each other and only one of the propellent components be injected in radially inward direction onto the concave toroidal outer surface of the inner nozzle portion, whereas the other propellent component is injected substantially in tangential direction onto a portion of the inner surface of the burner chamber spaced from the inner nozzle end in such a manner that the component thus injected will pass along the inner surface in countercurrent to the combustion gases forming in the burner chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
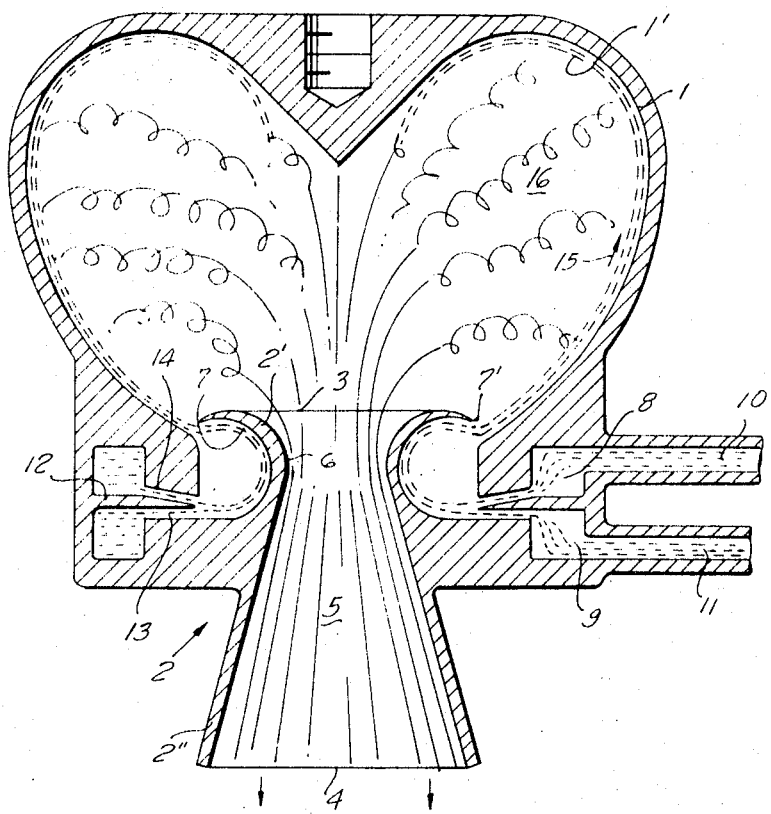
FIG. 1 is a schematic axial cross-section through one embodiment of a rocket drive cooling arrangement according to the present invention in which the two propellent components are mixed with each other in the region in which the propellent components are injected into the burner chamber.

Referring now to the drawings, and more specifically to FIG. 1 of the same, it will be seen that the arrangement according to the present invention includes wall means forming a burner chamber 1 having an inner surface 1' which is a surface of revolution symmetrical with respect to the central axis of the rocket drive and which in the embodiment shown in FIG. 1 has an axial cross-section of substantially heart-shaped contour. The arrangement includes further nozzle means 2 integral with the wall means forming the burner chamber 1 and arranged coaxially with the aforementioned axis of symmetry and having an inner portion 2' projecting into the burner chamber and havinng an inlet end 3 and a outer portion 2" having an outlet end 4. The outer surface 7 of the inner portion 2' of the nozzle means is a concave toroidal surface coaxial with the axis of the nozzle. The outer surface 7 ends at the inlet end 3 in a free annular edge 7' spaced from and facing the inner surface 1' of the burner chamber. The cross-section of the passage 5 through the nozzle 2 gradually decreases from the inlet end 3 to a smallest cross-section indicated at 6 and the cross section increases again from the smallest cross section gradually towards the outlet end 4. The smallest cross-section 6 is located substantially midway between the free edge 7' of the outer surface of the inner nozzle portion and the portion of the outer surface 7 opposite the edge 7' at which the outer surface blends into the bottom of the burner chamber.

The arrangement includes further a pair of passage means for respectively injecting propellent components, i.e., a liquid or a gaseous fuel and a liquid or gaseous oxidizing agent into the burner chamber. The pair of passage means comprise, in the embodiment as shown in FIG. 1, a pair of superimposed annular passages 8 and 9 surrounding the nozzle 2 substantially coaxially therewith and being separated from each other by a thin annular wall or membrane 12 which projects inwardly beyond the annular passages 8 and 9 through an annular gap formed in the wall of the combustion chamber to form with opposite annular surfaces of the aforementioned annular, gap, a pair of narrow annular gaps 13 and 14 through which the components of the propellent fed into the annular passages 8 and 9, respectively, through conduits 10 and 11 communicating therewith, are injected at high speed onto the concave toroidal outer surface 7 of the inner nozzle portion 2'. As seen in FIG. 1, the propellent components are injected against the bottom end portion of the outer surface 7 of the inner nozzle portion 2'.

In operation propellent components, i.e., a liquid or gaseous fuel and a liquid or gaseous oxidizing agent are respectively fed under pressure from a source, not shown in the drawing, through the conduits 10 and 11 into the annular passages 8 and 9 to pass at high speed through the annular gaps 13 and 14 in mixed condition onto the concave toroidal outer surface 7 of the inner nozzle portion 2' along which they flow due to the centrifugal force they are subjected to, and subsequently they pass over the free edge 7' of this outer surface onto the inner concavely curved surface 1' of the burner chamber to flow along the latter in form of a thin film as indicated by the arrow 15. Here the combustion takes place and the combustion gases 16 pass toward the center of the burner chamber and leave the latter through the passage 5 of the nozzle. As evident from FIG. 1, the propellent components pass along the outer surface 7 and along the inner surface 1' in countercurrent to the flow of the hot combustion gases through the combustion chamber and the nozzle passage 5. The arrangement above-described will produce a most intensive cooling effect in the region of the smallest cross-section 6 of the nozzle passage in which the greatest heat concentration takes place during operation of the arrangement.

Figure 1A:
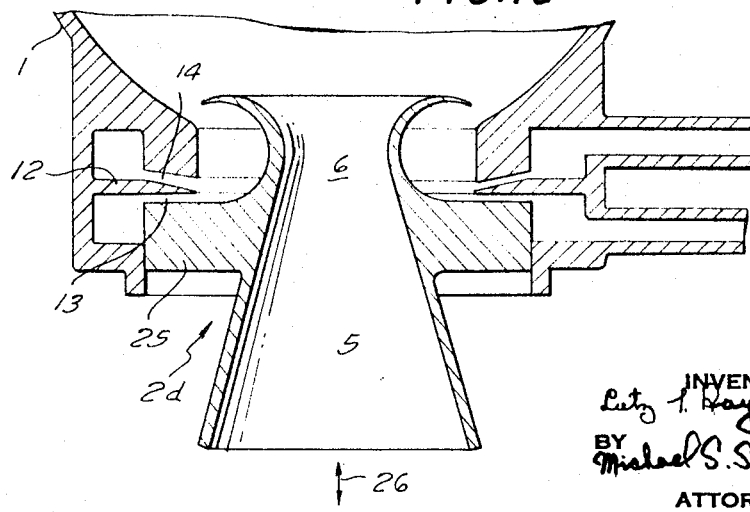
FIG. 1a is a partial cross-section similar to FIG. 1 and showing a slight modification of the arrangement shown in FIG. 1.

FIG. 1a illustrates in a partial cross-section a modification of the above-described arrangement shown in FIG. 1. The arrangement shown in FIG. 1a differs from the above-described arrangement illustrated in FIG. 1 in that the nozzle 2d and a wall portion 25, integral with the nozzle and surrounding the latter downstream of the smallest cross-section 6 of the nozzle passage 5, is axially adjustable as indicated by the arrow 26 with respect to the remainder of the wall portion 1 forming the burner chamber. For this purpose the wall portion 25 may be provided on its peripheral surface with an outer screw thread threadingly engaging a corresponding screw thread on the downwardly extending flange of the wall means forming the burner chamber, or the two surfaces may engage with a slide fit and separate means, not shown in the drawing, may be connected to the nozzle 2d to adjust the position of the latter in the direction as shown by the arrows 26. Such an adjustment will increase or decrease the gap 13, and, if the inner portion of the membrane 12 is flexible, such an adjustment will also permit to adjust the axial cross-section of the gap 14 so that the amount of propellent components fed into the burner chamber may be adjusted by adjusting the axial position of the nozzle means 2d.

As mentioned before it is sometimes advisable, especially if propellent components with a very short reaction time are used, not to mix the propellent components at the point of their injection into the burner chamber, but to inject the two components spaced from each other into the burner chamber and more specifically to inject one of the components against the concave toroidal surface 7 of the inner nozzle portion and the other component in substantially tangential direction onto a portion of the inner surface of the burner chamber spaced from the outer surface 7 of the inner nozzle portion.

Such arrangements are shown in FIGS. 2–5.

In the embodiments shown in FIGS. 2–5 the wall means 1a forming the burner chamber have an inner surface 1'a of substantially spherical configuration, but it is to be understood that the inner surface of the burner chamber may have the same configuration as shown in FIG. 1. The nozzle 2a is again arranged coaxially with the inner surface 1'a and the inner nozzle portion projecting into the interior of the burner chamber has an outer surface of substantially the same configuration as shown in FIG. 1. In the embodiments shown in FIGS. 2–5 the propellent components are, however, injected into the interior of the burner chamber at locations spaced from each other. Only one of the components is injected against the outer concavely curved toroidal surface 7 of the inner nozzle portion, and in the embodiment shown in FIG. 1 one of the propellent components is injected against the outer surface 7 of the inner nozzle portion through a plurality of passages 17 which extend substantially normal to the nozzle axis and inject the fuel component passing therethrough against the bottom end of the outer surface 7. The other propellent component is ejected through passages 18 extending substantially tangential to the inner surface 1'a and communicating with the interior of the burner chamber upstream of the inlet end of the nozzle 2a. The conduits which connect the passages 17 and 18 to a respective source of propellent components are not shown in the simplified FIG. 2.

Operation of the embodiment shown in FIG. 2 will be substantially the same as that described in connection with FIG. 1, that is one of the fuel components will be injected through the passages 17 onto the outer concavely curved toroidal surface 7 to pass from the free inner edge of the surface onto the inner surface 1'a of the burner chamber, whereas the other fuel component will be injected at high speed through the passages 18 directly onto the inner surface 1'a and both components will pass along the respective surface in countercurrent to the hot stream of combustion gases.

Figure 2:
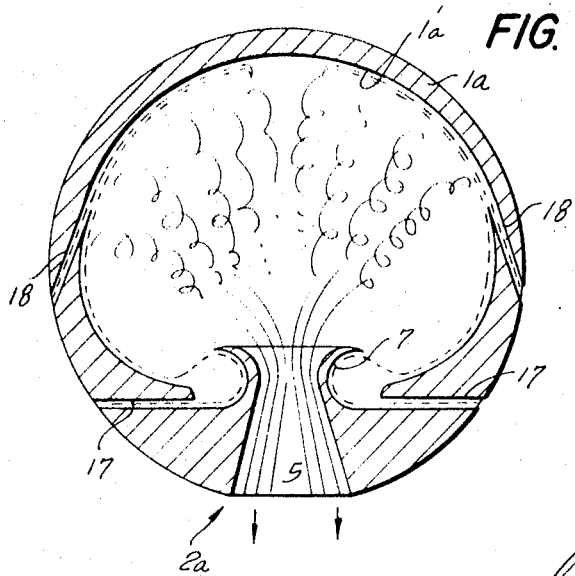
Figure 3:
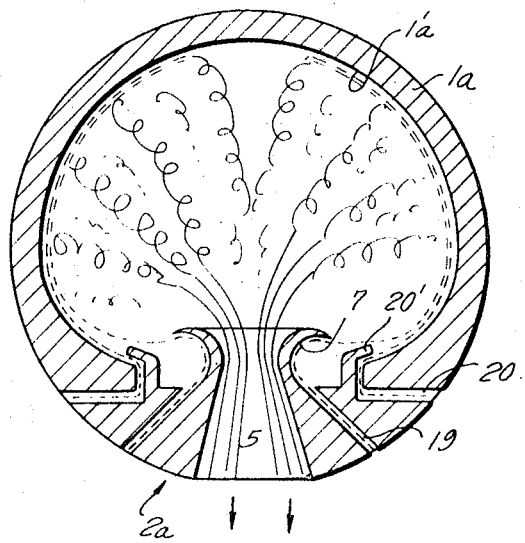
FIGS. 3–5 are axial cross-sections through modifications of the arrangement according to the present invention in which the two propellent components are injected at different locations into the burner chamber.

The embodiment shown in FIG. 3 differs from the above-described embodiment illustrated in FIG. 2 in that one of the fuel components is injected against the outer surface 7 of the inner nozzle portion through a plurality of passages 19 extending inclined at an acute angle to the axis of the nozzle passage 5, whereas the other fuel component is injected through a plurality of passages 20 having inner curved ends 20' substantially tangential to the inner surface 1'a of the burner chamber and directed away from the axis of the nozzle 2a.

Figure 4:
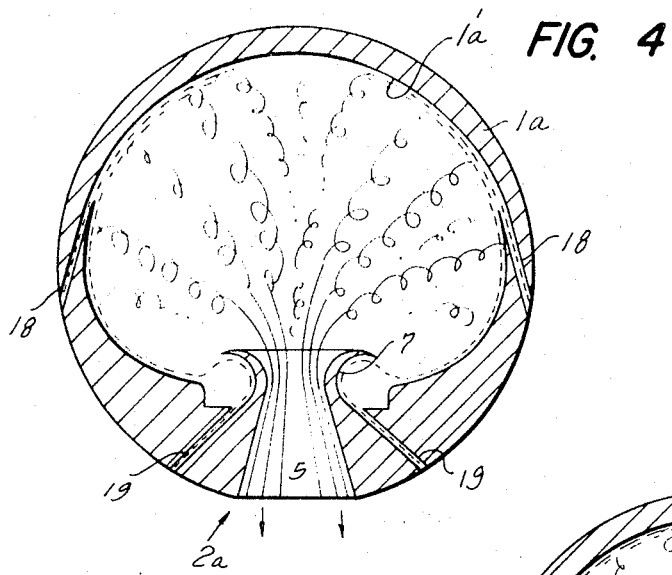

The embodiment shown in FIG. 4 has passages 19 as shown in FIG. 3 for injecting one of the propellent components onto the outer surface 7 of the inner nozzle portion, and passages 18 as shown in FIG. 2 for injecting the other propellent component in tangential direction onto the inner surface 1'a of the burner chamber.

Figure 5:
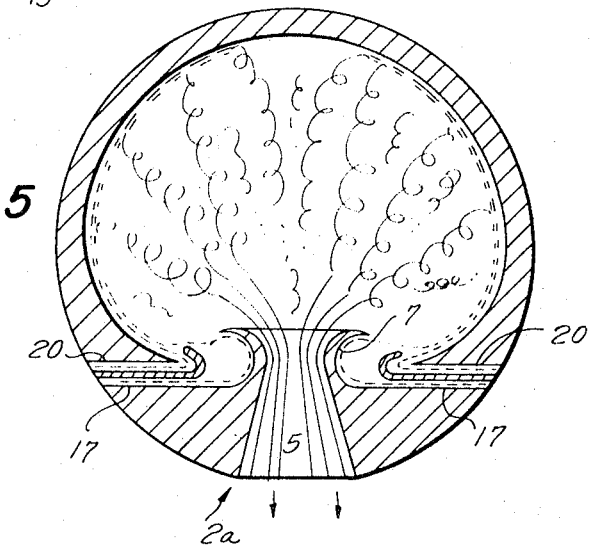

Finally, the embodiment shown in FIG. 5 has passages 17 as shown in FIG. 2 for injecting one of the fuel components against the concave toroidal surface 7 and curved passages 20 as shown in FIG. 3 for injecting the other fuel component directly onto the inner surface 1'a of the burner chamber.

Figure 6:
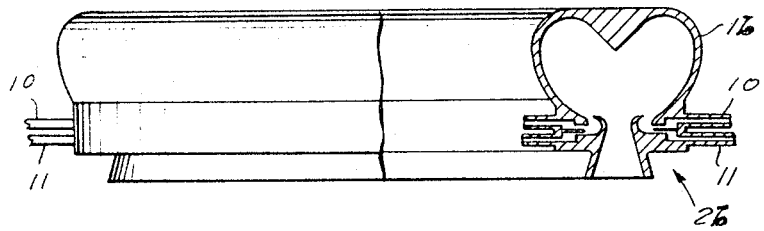
FIG. 6 is a schematic partial cross-sectional view of an arrangement according to the present invention drawn to a reduced scale in which the burner chamber is of toroidal shape.

FIG. 6 schematically illustrates at a smaller cross-section an embodiment in which the burner chamber 1b as well as the nozzle 2b communicating therewith are of annular shape. These annular shapes are derived by rotating the cross-section of the arrangement as shown in FIG. 1 about a vertical axis eccentrically arranged with regard to the axis of symmetry of the arrangement shown in FIG. 1. In this arrangement a plurality of conduits 10 and 11 may be provided for feeding fuel components into the annular passages 8 and 9 only schematically indicated in FIG. 6.

Figure 7:
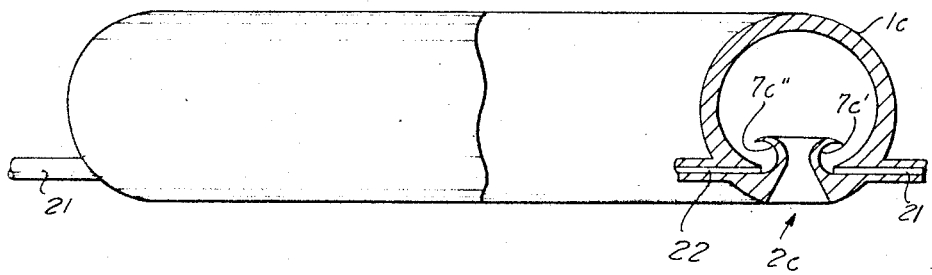
FIG. 7 is a schematic partially sectioned side view of another embodiment in which the combustion chamber is of toroidal shape.

In the embodiment shown in FIG. 7 the burner chamber 1c and the nozzle 2c are likewise of annular shape and in this arrangement the fuel components are respectively fed in radially inward and radially outward direction through the passages 21 and 22 against the annular concavely curved outer surface portion 7c' and 7c'' of the inner nozzle portion.

In the arrangements shown in FIGS. 6 and 7 it is also possible to construct the nozzle means adjustable in axial direction as illustrated in FIG. 1a to thereby adjust the amount of fuel components injected into the interior of the burner chamber.

In the arrangements shown in FIGS. 2–5 the inner ends of the passages through which the components are respectively injected into the interior of the burner chamber may be spaced a greater or smaller distance from each other than shown in these figures in accordance with the characteristics of the propellent components to prevent a premature combustion thereof.

The passages through which the propellent components are injected into the burner chamber may also be arranged to impart to the components a swirling movement about the axis of the nozzle by arranging the passages respectively tangential to a circle having its center on the aforementioned axis and being located in a plane inclined to this axis.

Obviously, the disclosed arrangements may be varied for use with propellents having more than two components.

It will be understood that each of the elements described above, or two or more together, may also find a useful application in other types of rocket drive cooling arrangements differing from the types described above.

While the invention has been illustrated and described as embodied in a rocket drive cooling arrangement, it is not intended to be limited to the details shown, since various modifications and structural changes may be made without departing in any way from the spirit of the present invention.

What is claimed as new and desired to be protected by Letters Patent is set forth in the appended claims.

I claim:

1. A rocket drive cooling arrangement comprising, in combination, wall means defining a burner chamber having an inner surface; nozzle means having an inner surface defining a nozzle passage, said nozzle means being connected to said wall means and having an inner portion extending into the burner chamber and having an inlet end and an outer portion integral with the inner portion and having an outlet end, said inner portion of said nozzle means having an outer concavely curved toroidal surface having at said inlet end a free annular edge spaced from and facing said inner surface of said burner chamber; and a pair of passage means for respectively injecting propellent components into said burner chamber, at least one of said passage means being arranged to inject the component passing therethrough in radially inward direction onto a portion of said outer surface of said inner nozzle portion opposite said free edge thereof so that the component will flow along said concave toroidal surface and pass from the free annular edge thereof onto said inner surface of the burner chamber to flow in form of a film along said inner surface, in countercurrent to the hot combustion gases forming in the burner chamber and leaving the latter through said nozzle passage, to thereby cool the inner nozzle portion and the wall means forming the burner chamber.

2. An arrangement as defined in claim 1, wherein said concave toroidal outer surface of said inner nozzle portion has in axial cross section a substantially semi-circular contour.

3. An arrangement as defined in claim 1, wherein said inner surface of said burner chamber is substantially spherical.

4. An arrangement as defined in claim 1, wherein said inner surface of said burner chamber is a surface of revolution having an axial cross section a substantially heart-shaped contour.

5. An arrangement as defined in claim 1, wherein the cross section of said nozzle passage gradually decreases from said inlet end to a smallest cross section and gradually increases from said smallest cross section to said outlet end, and wherein said smallest cross section of said nozzle passage is located between said free edge and said portion of said outer surface opposite said free edge.

6. An arrangement as defined in claim 1, wherein said pair of passage means are arranged for injecting the propellent components passing therethrough onto said portion of said outer surface of said inner nozzle portion opposite said free edge therefrom.

7. An arrangement as defined in claim 6, wherein said pair of passage means extend with radially inner portions thereof substantially normal to the axis of said nozzle means.

8. An arrangement as defined in claim 6, wherein said passage means comprise a pair of superimposed annular passages surrounding said nozzle means spaced therefrom, an annular membrane separating said annular passages from each other and projecting radially inwardly beyond the latter through an annular gap in said wall means to form with opposite surface defining said annular gap a pair of narrow annular gaps through which said components are respectively injected from said annular passages onto said concave toroidal outer surface of said inner nozzle portion, and a pair of passages for feeding propellent components respectively into said pair of annular passages.

9. An arrangement as defined in claim 8, wherein part of said wall means defining one of said opposite surfaces of said annular gap are integral with said nozzle means and adjustable with the latter in axial direction relative to the remainder of said wall means to thereby adjust the axial cross section of said annular gap.

10. An arrangement as defined in claim 1, wherein part of the wall means surrounding the nozzle means are integral with the latter and axially adjustable with respect to the remainder of the wall means to vary the cross section of at least said one passage means.

11. An arrangement as defined in claim 1, wherein the other of said pair of passage means has an end portion communicating with the interior of said burner chamber at a location spaced from said one passage means and extending substantially tangential to said inner surface of said burner chamber in a direction so that the components passing therethrough will flow along the inner surface in countercurrent to the hot combustion gases forming in the burner chamber and leaving the latter through said nozzle means.

12. An arrangement as defined in claim 11, wherein said one passage means extends substantially normal to the axis of said nozzle means.

13. An arrangement as defined in claim 11, wherein said one passage extends at an acute angle to said nozzle means.

14. An arrangement as defined in claim 1, wherein said passage means are constructed and arranged to impart to the propellent components as they enter the burner chamber a speed component tangential to a circle having its center at the axis of said nozzle means and being located in a plane transverse to said axis so that the propellent components will perform a swirling action about this axis.

15. An arrangement as defined in claim 1, wherein said burner chamber is of toroidal shape and said nozzle means is annular.

16. An arrangement as defined in claim 15, wherein the other of said pair of passage means is arranged opposite the one passage means to inject the propellent passing therethrough in radially outward direction onto a portion of said outer surface of said inner nozzle portion.

References Cited

UNITED STATES PATENTS 3,286,474  11/1966  Hoche _____ 60—258

FOREIGN PATENTS 847,084  9/1960  Great Britain.
1,024,290  2/1958  Germany.

CARLTON R. CROYLE, Primary Examiner

D. HART, Assistant Examiner

U.S. Cl. X.R.

60—39.74, 265, 271